(12) United States Patent
Young et al.

(10) Patent No.: US 6,652,896 B2
(45) Date of Patent: Nov. 25, 2003

(54) PROCESS FOR PREPARING A STABLE ACIDIC MILK BASED BEVERAGE

(75) Inventors: Paul J. Young, Oradell, NJ (US); Peter M. Bluestein, Demarest, NJ (US)

(73) Assignee: Nuvim, Inc., Paramus, NJ (US)

( * ) Notice: Subject to any disclaimer, the term of this patent is extended or adjusted under 35 U.S.C. 154(b) by 114 days.

(21) Appl. No.: 09/808,769

(22) Filed: Mar. 15, 2001

(65) Prior Publication Data

US 2002/0160086 A1 Oct. 31, 2002

(51) Int. Cl.⁷ .............................. A23C 3/00; A23C 9/00
(52) U.S. Cl. ................... 426/330.2; 426/34; 426/42; 426/580; 426/583; 426/590
(58) Field of Search .............................. 426/330.2, 580, 426/34, 41, 42, 330, 330.3, 583, 584, 590, 573, 574, 575, 576, 577, 650, 519

(56) References Cited

U.S. PATENT DOCUMENTS

| | | | | |
|---|---|---|---|---|
| 2,859,115 | A | 11/1958 | Rivoche ........................ 99/28 |
| 3,625,702 | A | 12/1971 | Exler ............................ 99/59 |
| 3,692,532 | A | 9/1972 | Shenkenberg et al. ......... 99/28 |
| 3,764,710 | A | 10/1973 | Inagami et al. ............. 426/185 |
| 3,800,052 | A | 3/1974 | Inagami et al. ............. 426/539 |
| 3,953,610 | A | 4/1976 | Little et al. .................. 429/39 |
| 4,031,264 | A | 6/1977 | Arolski et al. .............. 426/590 |
| 4,046,925 | A | 9/1977 | Igoe ............................ 426/573 |
| 4,078,092 | A | 3/1978 | Nishiyama et al. ......... 426/584 |
| 4,192,901 | A | * | 3/1980 | Yasumatsu et al. ......... 426/580 |
| 4,194,019 | A | * | 3/1980 | Yasumatsu et al. ......... 426/580 |
| 4,212,893 | A | * | 7/1980 | Takahata ................. 426/330.2 |
| 4,416,905 | A | 11/1983 | Lundstedt et al. ............. 426/34 |
| 4,460,616 | A | 7/1984 | Railland et al. ............. 426/580 |
| 4,478,855 | A | 10/1984 | Dahlen et al. ................. 426/41 |
| 4,486,413 | A | 12/1984 | Weisenberger et al. ..... 424/177 |
| 4,520,036 | A | 5/1985 | Railland et al. ............. 426/271 |
| 4,676,988 | A | 6/1987 | Efstathiou et al. ........... 426/271 |
| 5,648,112 | A | 7/1997 | Yang et al. .................. 426/580 |

\* cited by examiner

*Primary Examiner*—Leslie Wong
(74) *Attorney, Agent, or Firm*—Pitney, Hardin, Kipp & Szuch LLP

(57) ABSTRACT

Acidic milk based beverage products which do not precipitate over time and are physically stable, and a process for preparing these products, are disclosed. These products contain from about 0.5% to 5.0% milk proteins and 0.1 to 2.0% of a food stabilizer and a food acid sufficient to lower the pH below 4.5. The first step of the process involves mixing milk proteins with a food grade weak base to raise the pH above 7.0. Food grade stabilizers are added to the elevated pH mixture of milk proteins and base under low shear conditions. Other ingredients are then added to provide the desired sweetness, flavor, color and microbiological stability. This mixture is homogenized before acidification. A chilled food grade acid is then added at a temperature below 30° c. under low to moderate shear conditions.

23 Claims, No Drawings

PROCESS FOR PREPARING A STABLE ACIDIC MILK BASED BEVERAGE

BACKGROUND OF THE INVENTION

1. Field of the Invention

The present invention relates to a process for preparing a chilled beverage product, which contains milk and a food acid. The process of the present invention provides a means for making smooth-textured, low viscosity beverage products which contain milk proteins and a food acid, but which exhibit little or no sedimentation.

2. Description of the Prior Art

When formulating a flavored drink containing milk proteins at a low pH of between pH 3.5 and 4.5, which contains milk solids, whey proteins are generally favored because they are soluble under acidic conditions. Acidic, flavored drinks with casein proteins are known to be unstable and produce large amounts of casein precipitate. A process and formulation for flavored low pH milk protein-containing beverages, which provides for significantly improved stability of the casein proteins with 97 to 99% stability is herein disclosed. The explanation of the chemistry is below.

Milk proteins are generally divided into two classes: casein and whey. Casein is generally recognized as being insoluble under acidic conditions around its isoelectric point of about 4.6. This property of milk proteins is well known and is generally exploited in the manufacturing of cheese. Whey protein is more stable in acid solution and tends to offer less of a precipitation problem. A pH of 4.0 or less is desired for the milk beverage, however, to prevent microbial activity and thus allow for a longer shelf life and to provide a basis for fruit flavor.

Where a milk product which contains casein at a pH below 4.6 is desired, additional treatment is required such as the addition of stabilizers or other processes known in the art. Even these known processes have problems of precipitation over time, and require that the product be shaken prior to drinking.

Food grade stabilizers such as pectin, propylene glycol alginate, carboxymethylcellulose, xanthan gum, locust bean and combinations thereof have been used to prevent the sedimentation and coagulation of the milk proteins and to improve stability of the beverages. It is reported that even when these food stabilizers are employed, beverage products containing milk proteins and acid or acidic juice at a pH below 4.5 tend to exhibit undesirable sedimentation/precipitation over time.

It would be desirable to provide a stable acidic, milk based beverage product which shows enhanced stability with little or no sediment or precipitation. This product should be prepared with conventional processing techniques. The present invention discloses a composition and processing technique for an acidic, milk based beverage with enhanced stability.

Known methods for combining acidic fruit juices with milk products have taken several general approaches. Most common is the addition of a stabilizer to the mixture to control precipitation of milk proteins at a lowered pH.

U.S. Pat. No. 2,859,115 to Rivoche describes how mixing fruit juice with milk can cause milk proteins to precipitate, because the fruit juice lowers the pH of the beverage. The reference describes overcoming this problem through he use of stabilizers such as pectin. A food powder is mixed with a colloidal stabilizer such as pectin or algin in water, followed by the addition of an alkaline earth salt such as calcium carbonate. A dry acid powder, such as tartaric acid is then added to initiates gel formation. The stabilized mixture is then mixed with milk and stirred at a controlled shear so that the gel is broken up, and a desired viscosity is reached.

Similar approaches are employed in U.S. Pat. No. 4,031,264 to Arolski, et al., U.S. Pat. No. 4,046,925 to Igoe, and U.S. Pat. No. 4,078,092 to Nishiyama, all employ similar methods of creating a gel-stabilized mixture, which viscosity is then adjusted by the controlled application of mechanical shear. In Arolski, et al., a fruit mash is mixed with milk and the ensuing coagulation is then controlled by the addition of pectin as a stabilizer. The mixture is stirred and sterilized prior to storage. Igoe involves the formulation of a thickening agent from carboxymethyl cellulose, locust bean gum and xanthan gum in admixture. This stabilizer, with sugar, is added to milk, followed by the addition of fruit juice. In Nishiyama sodium carboxymethyl cellulose is added to the fruit juice first to form a juice composition which can then be added to milk to produce a stable milk product.

U.S. Pat. No. 5,648,112 to Yang, et al. describes mixing milk with a food stabilizer under high shear mixing conditions and maintaining a median particle size of less than 0.8 microns to prevent precipitation of milk proteins. Afterward, the pH is reduced to between 3.2 and 4.5 by the addition of food grade acid.

U.S. Pat. No. 3,692,532 to Shenkenburg, et al. describes a process whereby a stabilizer having carboxyl groups is added to milk, followed by the addition of fruit juice. According to the process disclosed, sugar and carboxymethyl cellulose are mixed with milk, and sufficient time allowed for the carboxyl groups of the stabilizer to react with the casein. The described reaction is said to occur at temperatures below 90° F., and the resulting mixture is aged, pasteruized and homogenized. The resulting product is stated to be stable at a pH below 5.0.

Another approach to creating a stable milk and fruit juice beverage is employed in U.S. Pat. No. 4,520,036 to Rialland, et al., and U.S. Pat. No. 4,676,988 to Efstathiou, et al. These two refernces describe a process whereby milk is passed through a cation exchange resin. The pH of the milk is thus lowered to a value 3.8 (Rialland, et al.) and to between 3.2 and 1.5 (Efstathiou, et al.).

Lastly, U.S. Pat. No. 4,416,905 to Lundstedt, et al. describes permitting milk to ferment and achieve a pH in the range between 6.2 to 4.9 and then acidifying the beverage to a pH below 4.7, to produce a better tasting butter milk product

SUMMARY OF THE INVENTION

It is therefore the object of the present invention to provide a milk protein beverage which contains milk proteins and a food acid, said beverage having a long shelf life and exhibiting little or no sedimentation over time.

It is a further object of the present invention to provide a means for making a milk protein beverage which contains milk proteins and a food acid, said beverage having a long shelf life and exhibiting little or no sedimentation over time.

It is a further object of the present invention to provide a nutritious and flavorful milk protein beverage which exhibits a smooth texture and a low viscosity, and a means for making same.

The present invention relates to a composition and a process for preparing an acidic milk protein based beverage product. The products prepared according to the process of the present invention are stable and do not show sediment or precipitate over time. These products contain from about 0.5% to 5.0% milk proteins and 0.5 to 2.0% of a food stabilizer mixture and a food acid sufficient to lower the pH below 4.5.

The present invention comprises concentrated milk protein which is a dry powder which is reconstituted with water to form a solution of milk proteins, specifically casein and whey. The milk protein may be substituted with other milk products, such as whole milk, skim milk, dehydrated milk powder, etc.

The process of the present invention comprises, as a first step, mixing the milk proteins with a weak base to elevate the pH. The weak base can be a salt of a weak organic acid, such as sodium citrate, sodium malate, sodium lactate or sodium fumerate. Sodium citrate is the preferred weak base additive. The sodium citrate is added to the concentrated milk protein in sufficient amounts to raise the pH to a range of 7.0 to 8.0.

The addition of weak base creates an environment wherein the casein molecules are enhanced in a manner which promotes the association of stabilizer molecules to the surface of the protein. The basic environment also reduces the role of calcium by inhibiting the bridging of calcium with the protein, thus limiting coalescence and sedimentation of the proteins.

Stabilizers are then added to the mixture. Stabilizers employed in the invention include pectin, propylene glycol alginate and others, which consist of acidic hydrocolloids. These acidic hydrocolloids are negative charged bodies when present in the basic environment. The negatively charged hydrocolloids adhere to the surface of casein molecules, forming colloidal complexes which are themselves negatively charged. These colloidal complexes resist agglomeration, and thus remain in stable suspension in the mixture, even at low pH and low viscosity.

The food stabilizer is added under low shear conditions sufficient to form an intimate mixture. These conditions avoid excessive shear for extended periods of time, which can act to break up the negatively charged colloidal complexes, denature the milk proteins and cause foam.

Upon formation of the negatively charged colloidal complexes which effectively stabilize the milk proteins, optional ingredients, such as flavors, colors, sweeteners, vitamin and mineral supplements, microbiological stabilizers, etc. may then be added. The mixture is then homogenized and cooled below 30° C., preferably below 10° C.

Acid is then added under low shear conditions to the cooled mixture. A food grade acid such as citric acid is added to bring the pH down to between 3.2 and 4.5. The acid is added in a chilled state, generally below 10° C. Mixing remains under low-shear conditions, so as not to break up the stable colloidal complexes.

The final product is then packaged and may stored at room temperature or refrigerated.

DETAILED DESCRIPTION OF THE PREFERRED EMBODIMENT

The present invention relates to a formulation and process for preparing acidic milk based beverage products which develop little of no sediment or precipitation over time. The beverages provide the milk appearance and the flavor of a fruit flavored milk drink at a low viscosity, thus providing a refreshing and rich beverage which is unique.

Generally, milk products are formulated at a high pH to avoid sedimentation and precipitation. Milk proteins are known to be unstable at low pH. The stability of the protein must be enhanced with food grade stabilizers or gums, which coat the surface of the protein and inhibit the sedimentation. Mixing of the milk protein with a weak base enhances the structure of the casein proteins and improves the coating of the casein particle with the stabilizing gums. The weak base also can reduce the role of calcium in promoting the coalescence and sedimentation of milk proteins. The stabilizers can be predissolved in water or added directly to the alkaline milk protein base under low shear conditions, to produce the intimate mixture of milk proteins and stabilizers. Optional ingredients are added and the mixture is homogenized to ensure a uniform mix and dispersion. Acid is added under cooled conditions to a pH below 4.5.

Particular ingredients and processing steps are described below.

A. Process Materials

The materials employed in the process of the present invention include milk or concentrated milk protein, a weak base, a food acid and food stabilizer, as well as other optional ingredients. These are described more particularly as follows:

1. Milk

The milk proteins used in the process of the present invention may be derived from all forms of milk including, but not limited to, whole milk, skim milk, milk powder, concentrated milk proteins and whey. The milk proteins can be from a dairy ingredient of any form: native, homogenized, concentrated or powder. The amount of milk protein employed in the formulation of the present invention and present in the final beverage products will typically range from about 0.5% to about 5.0% preferably from about 1.0% to about 4.0% which is equivalent to the protein content of native milk.

2. Weak Base

The formulation and process employ a weak base to condition the structure of the milk proteins for coating with food stabilizers. The weak base can be salts of weak organic acids like sodium citrate, sodium malate, sodium lactate, or sodium fumarate. Sodium citrate is preferred. Typically, when this is added to the milk proteins, the resulting pH is within a range of 7.0 to 8.0, preferably 7.3–7.7.

3. Food Acid

The process of the present invention also employs a food acid. The food acid can include any food grade organic or inorganic acid, for example, citric acid, malic acid, lactic acid, gluconic acid, succinic acid, tartaric acid, phosphoric acid, fumaric acid, and ascorbic acid. Aliphatic hydroxycarboxylic acids (e.g., malic acid, lactic acid, and citric acid) are typically preferred for use herein. Citric acid is most preferred for use herein.

The amount of acid employed is an amount sufficient to adjust the pH of the milk/stabilizer mixture to from about 3.2 to about 4.5, preferably from about 3.5 to about 4.5, most preferably from about 3.8 to about 4.2. Where the acid used is citric acid, typically the citric acid is added in an amount ranging from about 0.3% to about 1.0% by weight of the beverage, preferably between 0.5 to 0.8%.

4. Stabilizer

The various food stabilizers which can be employed in the present invention include hydrophilic colloidal stabilizers commonly known in the art such as gum arabic, gelatin, xanthan, locust bean, propylene glycol alginate, and pectin, as well as anionic polymers derived from cellulose (e.g., carboxymethylcellulose), which are water soluble and tolerant of low pH's. A blend of pectin and propylene glycol alginate is typically preferred for use herein.

The stabilizer is typically used in an amount ranging from about 0.1% to about 2.0% by weight of the beverage, preferably from about 0.3% to about 1.0%. The amount of stabilizer used is dependent in part on the level of milk solids present in the beverage product. In general, the greater the level of milk solids present in the beverage, the more stabilizer that will be required to stabilize the beverage. The mixture of stabilizers can be adjusted to provide low beverage viscosity and stability of the milk proteins.

5. Other Ingredients

Acid dairy beverages usually are formulated to provide a base for fruit flavored products. The fruit flavor can be supplied from fruit juice, fruit concentrates, or flavors, as desired.

The formulation of the present invention can also employ a sweetener. The sweetener can include, for example, maltose, sucrose, glucose, fructose, invert sugars and mixtures thereof. These sugars can be incorporated into the beverage products in solid or liquid form, but are typically incorporated as a syrup, more preferably as concentrated syrup such as high fructose corn syrup. For purposes of preparing the beverage products described herein, these optional sweeteners can be provided to some extent by other components of the beverage products, such as by the fruit juice component. Sweeteners are typically employed in the process of the present invention in amounts ranging from about 0.0% to about 15%.

Preferred carbohydrate sweeteners for use in the process of the present invention are sucrose, fructose and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose.

Artificial or noncaloric sweeteners for use in the formulation of the present invention include, for example, saccharin, cyclamates, acetosulfam, L-aspartyl-L-phenyalanine lower alkyl ester sweeteners (e.g., aspartame). A particularly preferred sweetener is aspartame. They may be used as the sole source of sweetness or in combination with caloric sweeteners discussed above. Artificial or noncaloric sweeteners, if used, are typically employed in an amount ranging from about 0.02% to about 1%, preferably from about 0.02% to about 0.10% by weight of the beverage products.

The process of the present invention can also optionally employ a preservative. Any food grade preservative can suitably be used in the process of the present invention. Suitable preservatives include sorbic acid, benzoic acid, alkali metal salts thereof, and mixtures thereof. Preferred preservatives include sodium benzoate and potassium sorbate. The preservative is typically present in an amount ranging from about 0.01% to about 0.10% by weight of the beverage product, depending on the method and temperatures of commercial distribution.

The formulation of the present invention can also be fortified with various vitamins and minerals.

B. Process Steps

Milk proteins are added to a solution of a weak base. If the milk protein are in the dry form sufficient time is provided for a uniform dispersion and hydration. This time is highly dependent on the temperature of the solution. At 35° C., two minutes at high shear and 10 minutes at low shear are sufficient to provide a uniform dispersion. The resulting mixture has an elevated pH, which is within a range of 7.0 to 8.0, preferably 7.3 to 7.7.

Stabilizers perform best when they are prepared by dispersion and hydration in heated water before the addition to milk proteins. This can be accomplished by many combinations of time, temperature, and shear and depends on the stabilizers employed. For the preferred pectin and propylene glycol alginate mixture, it is desirable to use heated water at a temperature between 55° C. and 75° C. Under high shear conditions, 5 minutes is sufficient to disperse and hydrate the stabilizers. Under low shear conditions, 20 minutes is sufficient to disperse and hydrate the stabilizers. The fully hydrated stabilizers are added to the alkaline milk proteins employing low shear and sufficient time to ensure a complete mixture.

Optional ingredients can then be added to the weak base/milk protein/stabilizer mix. If these ingredients are in dry form like sodium benzoate, etc., care should be taken to ensure a complete solution is achieved.

The unacidified mix is homogenized under conventional conditions. A two-stage piston homogenizer can be employed at 500/2000 homogenization pressures. The homogenization pressures are not critical to the process and should be sufficient to provide a smooth homogenous mix.

Acid can then be added to the homogenized mixture with low shear. It is beneficial to dissolve powdered acids before there addition to the protein mixture. This provides a better mixing of the acid with the protein under low shear conditions. The mix should be cooled before the addition of acid to below 30° C., preferably below 10° C. The acid is similarly cooled to between 1° C. and 30° C. Acid addition rate is not critical to the stability of the mix.

EXAMPLES

Example 1

Ingredients are used in the following proportions.

| Ingredients | Weight % |
| --- | --- |
| Water | 90.56 |
| Aspartame | 0.04 |
| Milk protein | 2.35 |
| Sodium citrate | 0.34 |
| Vitamin premix | 0.15 |
| Sodium benzoate | 0.01 |
| Potassium sorbate | 0.01 |
| High fructose corm syrup | 4.89 |
| Propylene glycol alginate | 0.46 |
| Pectin | 0.21 |
| Citric acid | 0.68 |
| Flavor | 0.19 |
| Color | 0.12 |

A tank with high shear is beneficial for completely dispersing and dissolving dry ingredients. Initially, 30 pounds of sodium citrate is dissolved in 3500 pounds of water at 35° C. this is followed by the addition of 208 pounds of dried milk protein concentrate to the sodium citrate solution. The solution is mixed for 2 minutes under high shear, and then is transferred to a larger tank with a low shear mixer for the addition of other ingredients. In a separate vessel, 41 pounds of propylene glycol alginate and 19 pounds of pectin are dissolved in 2000 pounds of water at 65° C. and mixed for 5 minutes. The stabilizers are added to the alkaline milk protein.

The remainder of all the other ingredients except the acid are pre-dissolved in 1500 pounds of water and mixed for 2 minutes. The mix is then homogenized in a two-stage piston homogenizer with back pressures of 500/2000 psi. The mix is cooled to less than 5° C. and the chilled acid (below 5° C.) is added to the homogenized mix with a low shear mixer. The resulting product exhibits little or no sediment.

Thus, the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A process for preparing an acidified stable milk-based beverage with a pH below 4.5, said process comprising the following steps:
   A. adding milk protein to a solution of a weak base, resulting in a mixture, wherein said weak base is a salt of a weak organic acid, said organic acid being selected from the group consisting of malic acid, lactic acid, citric acid, gluconic acid, succinic acid, tartaric acid, fumaric acid and ascorbic acid;
   B. adding a stabilizer to said mixture;
   C. homogenizing said mixture, resulting in a homogenized mixture;
   D. cooling said homogenized mixture to a low temperature; and
   E. adding an acid at low temperature to said homogenized mixture under low shear conditions, said acid being selected from the group consisting of malic acid, lactic acid, citric acid, gluconic acid, succinic acid, tartaric acid, phosphoric acid, fumaric acid and ascorbic acid;
   wherein the execution of steps A, B, C, D and E are in series thereby resulting in a final product.

2. The process as claimed in claim 1 wherein said milk protein is selected from the group consisting of concentrated milk protein, whole milk, skim milk, condensed milk, dehydrated milk and nonfat dry.

3. The process as claimed in claim 1 wherein said milk protein is concentrated milk protein, either in liquid or powder form.

4. The process as claimed in claim 1 wherein said final product contains said milk protein in an amount of from 0.5% to 5.0% by weight.

5. The process as claimed in claim 1 wherein said final product contains said milk protein in an amount of from 1.0% to 4.0% by weight.

6. The process as claimed in claim 1 wherein said weak base is present in an amount sufficient so that said mixture has a pH between 7.0 to 8.0.

7. The process as claimed in claim 1 wherein said weak base is present in an amount sufficient so that said mixture has a pH between 7.3 to 7.7.

8. The process as claimed in claim 1 wherein said weak base is selected from the group consisting of sodium citrate, sodium malate, sodium lactate and sodium fumarate.

9. The process as claimed in claim 1 wherein said weak base is sodium citrate.

10. The process as claimed in claim 1 wherein said stabilizer is selected from the group consisting of carboxymethylcellulose, gum arabic, gelatin, xanthan, locust bean, propylene glycol alginate and pectin.

11. The process as claimed in claim 1 wherein said stabilizer is a blend of propylene glycol alginate and pectin.

12. The process as claimed in claim 1 wherein said step of adding a stabilizer further comprises adding said stabilizer in an amount ranging from 0.1% to 2.0% by weight.

13. The process as claimed in claim 1 wherein said step of adding a stabilizer further comprises adding said stabilizer in an amount ranging from 0.3% to 1.0% by weight.

14. The process as claimed in claim 1 wherein said wherein said step of adding a stabilizer further comprises fully hydrating said stabilizer prior to addition.

15. The process as claimed in claim 1 wherein said step of homogenizing is conducted at a homogenizer pressure of 500/2000 psi.

16. The process as claimed in claim 1 wherein said low temperature of said step of cooling is below 30° C.

17. The process as claimed in claim 1 wherein said low temperature of said step of cooling is below 10° C.

18. The process according to claim 1 wherein said acid is citric acid.

19. The process as claimed in claim 1 wherein said step of adding acid further involves the step of cooling said acid to below 20° C. prior to addition.

20. The process as claimed in claim 1 wherein said step of adding acid further involves the step of cooling said acid to below 10° C. prior to addition.

21. The process as claimed in claim 1 wherein said step of adding acid comprises adding said acid in an amount sufficient to result in a pH between 3.2 and 4.5.

22. The process as claimed in claim 1 wherein said step of adding acid comprises adding said acid in an amount sufficient to result in a pH between 3.8 and 4.2.

23. The process as claimed in claim 1 further comprising the step of adding at least one of a caloric sweetener, an artificial sweetener, a preservative and a vitamin.

* * * * *